(12) United States Patent
Lau

(10) Patent No.: US 10,271,564 B2
(45) Date of Patent: Apr. 30, 2019

(54) AUTOMATIC BEANCURD SHEET MAKING MACHINE PROVIDED WITH COOLING GROOVES

(71) Applicant: FULLY PLUS ENTERPRISE LIMITED, New Territories Hong Kong (CN)

(72) Inventor: Siu Fai Lau, New Territories Hong Kong (CN)

(73) Assignee: FULLY PLUS ENTERPRISE LIMITED, New Territories, Hong Kong (CN)

( * ) Notice: Subject to any disclaimer, the term of this patent is extended or adjusted under 35 U.S.C. 154(b) by 481 days.

(21) Appl. No.: 15/222,224

(22) Filed: Jul. 28, 2016

(65) Prior Publication Data

US 2017/0135361 A1 May 18, 2017

(30) Foreign Application Priority Data

Nov. 13, 2015 (CN) .......................... 2015 1 0785378

(51) Int. Cl.
*A23C 9/12* (2006.01)
*A23C 20/00* (2006.01)
*A23C 20/02* (2006.01)
*A23L 11/00* (2016.01)
*A47J 43/00* (2006.01)

(52) U.S. Cl.
CPC .............. *A23C 20/025* (2013.01); *A23C 9/12* (2013.01); *A23C 9/122* (2013.01); *A23L 11/00* (2016.08); *A47J 43/00* (2013.01); *A23V 2002/00* (2013.01)

(58) Field of Classification Search
CPC .......... A23C 9/122; A23C 9/12; A23C 20/025; A23P 20/00
USPC ... 99/460, 461, 465, 466, 483, 450.1, 450.4, 99/443 C
See application file for complete search history.

(56) References Cited

U.S. PATENT DOCUMENTS

| 4,771,681 A * | 9/1988 | Nagata ................. A23C 20/025 53/127 |
| 5,957,042 A * | 9/1999 | Iwamoto ................. A23P 20/20 99/452 |

(Continued)

*Primary Examiner* — Reginald Alexander
(74) *Attorney, Agent, or Firm* — Muncy, Geissler, Olds & Lowe, P.C.

(57) ABSTRACT

The embodiment of the present invention discloses an automatic beancurd sheet making machine provided with cooling grooves. The automatic beancurd sheet making machine consists of a machine frame, a water tank, a soybean milk groove, a soybean milk circulating pump, cooling grooves, air blow pipes, a beancurd sheet collecting drum and conveyor belts. According to the automatic beancurd sheet making machine disclosed by the embodiment of the present invention, continuous sheet picking can be performed on beancurd sheets formed in the soybean milk groove, a condition that the machine needs to be stopped for sheet forming is avoided, and beancurd sheets can realize natural absorption of residual heat of the soybean milk groove on the conveyor belts like original manual work so as to realize drying by airing. The dried beancurd sheets are cut, and then packed, and automatic continuous operation is realized. The production efficiency is improved, the cost is reduced, consistent texture is guaranteed, and the defects of long-time training of skilled workers and anthropic factors are overcome.

7 Claims, 2 Drawing Sheets

(56) References Cited

U.S. PATENT DOCUMENTS

2010/0275790 A1* 11/2010 Takai .................... B65G 15/08
                                                                         99/443 C
2018/0303150 A1* 10/2018 Takai ................... A23C 20/025

\* cited by examiner

AUTOMATIC BEANCURD SHEET MAKING MACHINE PROVIDED WITH COOLING GROOVES

TECHNICAL FIELD

The present invention relates to the field of making of beancurd sheets, in particular to an automatic beancurd sheet making machine provided with cooling grooves.

BACKGROUND ART

A conventional making machine consists of water tank round pots and a wave frame, wherein soybean milk is injected into the round pot to be cooked. A circular surface layer is formed on surface protein, and then picked sheets are hung on bamboo poles. A stainless steel manufacturing machine consists of 32 pots in two rows, wherein the length of each of the pots is 12 m, and the diameter of each of the pots is 76 cm. Beancurd sheets are picked by a master worker, when the beancurd sheets in the pot achieve certain thickness, the master worker performs sheet pickling once (for 20-40 minutes as needed), and the picked sheets are directly hung on bamboo poles. Then, the bamboo poles are put on the wave frame, and the wave frame is placed directly over on a beancurd sheet furnace. Temperature (dissipated heat) generated by the beancurd sheet furnace and flowing wind (air inlet windows are arranged at one end of a workshop, and strong exhaust fans are arranged on the opposite side) are used for natural drying by airing, and the sheets are collected in a package freezer (−18° C.) of a package department. So such manner causes that beancurd sheets cannot be in vigorous expansion, companies are difficult to develop, a large number of workers are needed for intermittent production, the efficacy is low, and thickness, texture and production quality cannot be adequately guaranteed. The workers can only skillfully grasp the operation for a long term, consistent quality is difficult to control, the workers are rare, and one beancurd sheet master worker needs experience of more than one year from beginner to skilled worker, so that the development of the companies is directly blocked.

SUMMARY OF THE INVENTION

In order to solve the technical problem in the prior art, an embodiment of the present invention provides an automatic beancurd sheet making machine provided with cooling grooves, which is high in production efficiency, can realize continuous sheet picking, and can also realize natural drying.

An automatic beancurd sheet making machine provided with cooling grooves, comprising a machine frame and a water tank arranged in the machine frame, a soybean milk groove is formed in the upper part of the water tank in a sealing inlaid manner, and steam pipes are arranged in an inner cavity of the water tank; a soybean milk circulating pump is connected below one end of the soybean milk groove, and an upward-sloping conveyor belt is arranged above one end of the soybean milk groove; and a parallel conveyor belt is further arranged above the soybean milk groove, one end of the parallel conveyor belt is connected with the upward-sloping conveyor belt, the other end of the parallel conveyor belt is arranged in the machine frame and is connected with a beancurd sheet collecting drum arranged on one side of the machine frame, and the cooling grooves are respectively formed in two sides of the soybean milk groove;

sections of the cooling grooves are in one shape of a circle, square, or rectangle; and the cooling grooves are copper pipes.

As further improvement of the technical scheme, a transmission component of the upper parallel conveyor belt comprises a first rotating shaft arranged at the front end, a middle rotating shaft arranged at the middle, and a tail rotating shaft arranged at the tail, wherein the first rotating shaft is positioned close to the upward-sloping conveyor belt, and the tail rotating shaft is positioned close to the beancurd sheet collecting drum.

The soybean milk groove is a rectangular flat bottom container and is formed in the water tank in a sealing inlaid manner, steam pipes are fully distributed in the inner cavity of the water tank, and steam traps are mounted at the tail ends of the steam pipes.

The upward-sloping conveyor belt and the parallel conveyor belt both are connected with a driving motor arranged in the machine frame.

Ten sets of stainless steel air blow pipes with circular apertures are connected to the blower, and the stainless steel air blow pipes are distributed exactly above the soybean milk groove, and the circular apertures face downward to blow wind directly to the soybean milk groove.

Implementation of the embodiment of the present invention has the following beneficial effects:

According to the automatic beancurd sheet making machine disclosed by the embodiment of the present invention, continuous sheet picking can be performed on beancurd sheets formed in the soybean milk groove, a condition that the machine needs to be stopped for sheet forming is avoided, and beancurd sheets can realize natural absorption of residual heat of the soybean milk groove on the conveyor belts like original manual work so as to realize drying by airing. The dried beancurd sheets are cut, and then packed, and automatic continuous operation is realized. The production efficiency is improved, the cost is reduced, consistent texture is guaranteed, and the defects of long-time training of skilled workers and human factors are overcome.

DETAILED DESCRIPTION OF THE INVENTION

Figure 1:
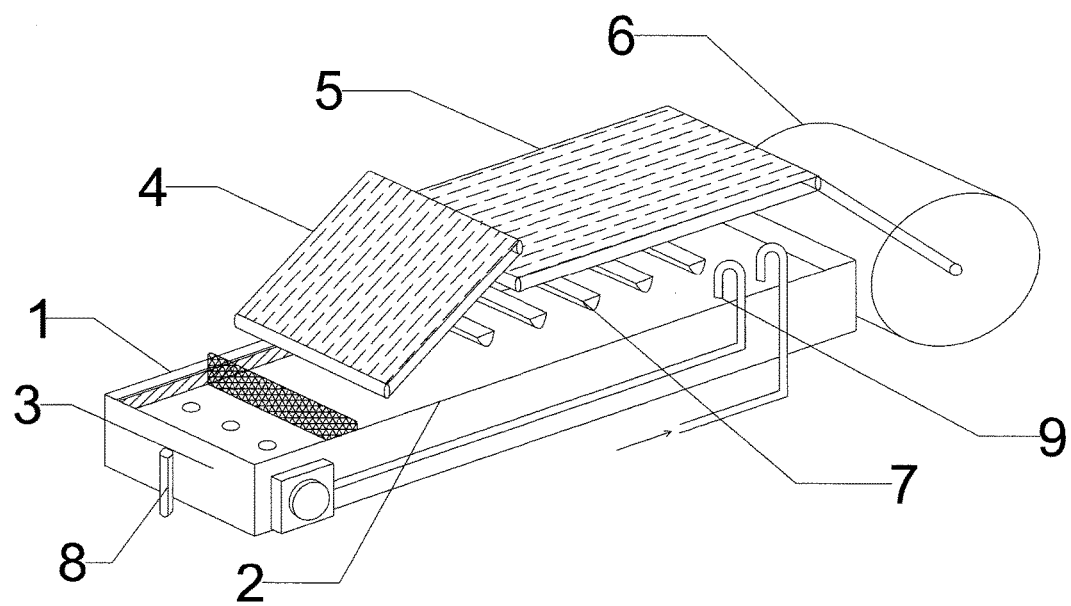
FIG. 1 is a schematic diagram of the structure of the embodiment of the present invention.
Figure 2:
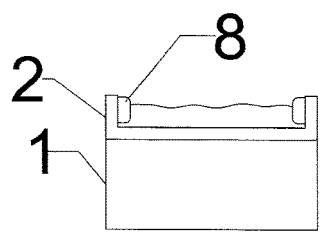
FIG. 2 is a schematic diagram of the structure of a rectangular section of a cooling pipe of the embodiment of the present invention.
Figure 3:
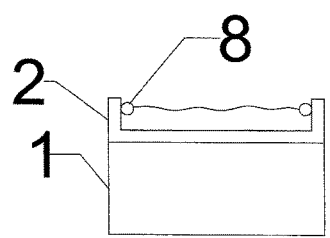
FIG. 3 is a schematic diagram of a structure of a circular section of a cooling pipe of the embodiment of the present invention.
Figure 4:
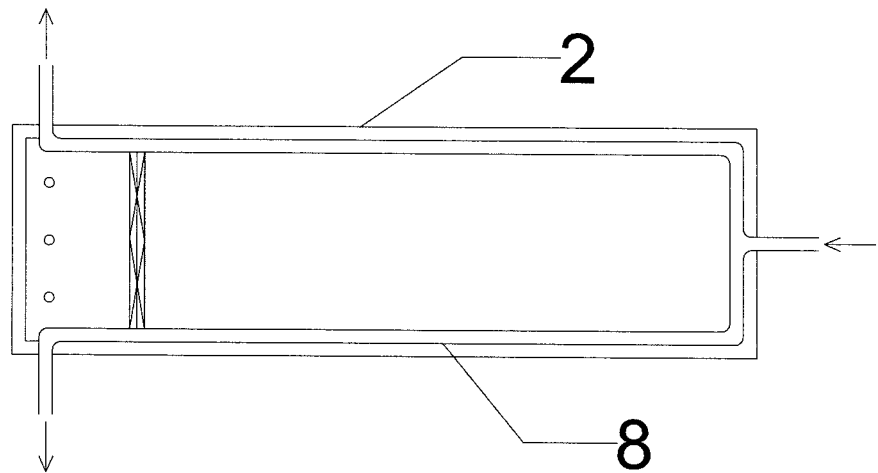
FIG. 4 is a schematic diagram of a cooling pipe-shaped structure of the embodiment of the present invention.
Figure 5:
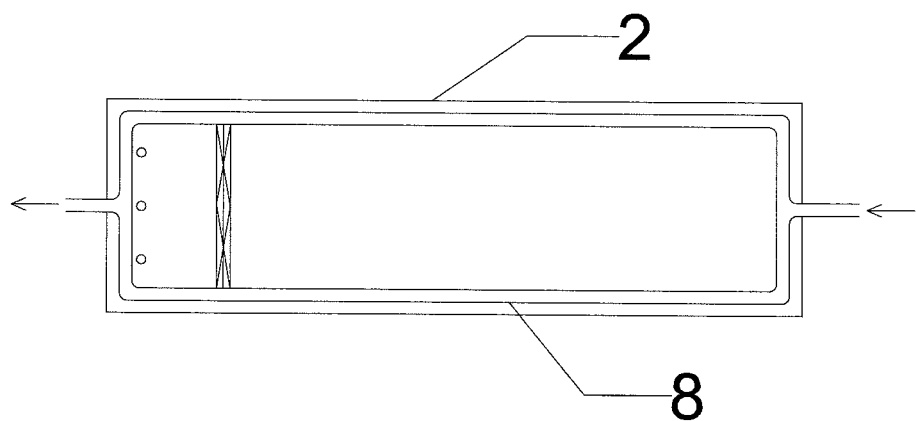
FIG. 5 is a schematic diagram of a cooling pipe-shaped structure of the embodiment of the present invention.
Figure 6:
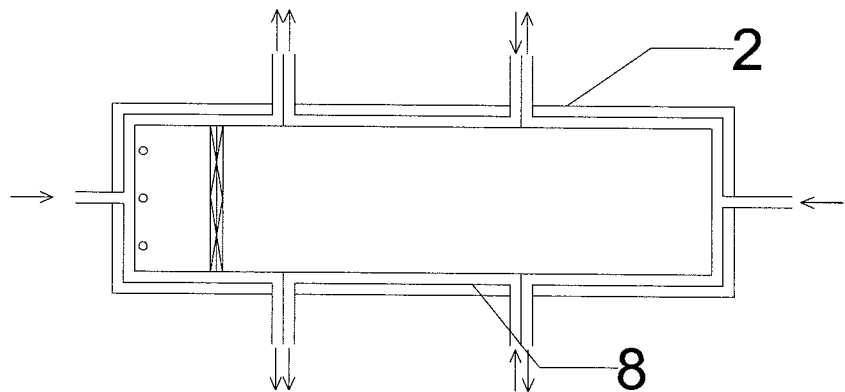
FIG. 6 is a schematic diagram of multiple sets of the cooling pipe-shaped structure of the embodiment of the present invention.

In order to make the objects, technical solutions, and advantages of the present invention more apparent, the present invention will be further described in more detail hereinafter with reference to accompanying drawings.

An automatic beancurd sheet making machine with cooling grooves provided by the embodiment of the present invention comprises a machine frame and water tank 1 arranged in the machine frame, wherein a soybean milk groove 2 is formed in the upper part of the water tank 1 in a sealing manner, and steam pipes are distributed in the inner cavity of the water tank 1; and a soybean milk circulating pump 3 is connected below one end of the soybean milk groove, and an upward-sloping conveyor belt 4 is arranged above one end of the soybean milk groove. The soybean milk circulating pump 3 continuously delivers soybean milk from the front-end soybean milk groove to the tail-end soybean milk groove during operation so as to achieve the flow of soybean milk during production, prevent the soybean milk from destroying protein structures in the soybean milk groove and flowing in the beancurd sheet soybean milk groove downwards, thereby facilitating delivery. A parallel conveyor belt 5 is further arranged above the soybean milk groove 2, one end of the parallel conveyor belt 5 is connected with the upward-sloping conveyor belt 4, the other end of the parallel conveyor belt 5 is arranged in the machine frame and connected with a beancurd sheet collecting drum 6 arranged on one side of the machine frame. The lower part of the water tank 1 is further connected to a blower, a plurality of air blow pipes 7 are connected to the blower, and air outlets of the air blow pipes 7 face to the soybean milk groove 2.

Cooling grooves 8 are formed in two sides of the soybean milk groove 2 and are used for preventing the soybean milk from forming sheets at the edges of the soybean milk groove. If the cooling grooves are not formed, and when the temperature of the edges of the soybean milk groove reaches 60° C., the soybean milk cannot form sheets at the edges of the stainless steel soybean milk groove. When the rotating shaft conveys the beancurd sheets, only the beancurd sheets are attached to the edges of the soybean milk groove; when the beancurd sheets are torn out or broken, the transverse section may be circular; if the transverse section is prismatic or rectangular, the edge contact surface can be kept, and the temperature is uniform; the cooling grooves can adopt water cooling and are copper pipes. Heat exchange capacity is enhanced; two cooling grooves 8 are formed in the left, two cooling grooves 8 are formed in the right, a water inlet is formed in the head of the soybean milk groove, a water outlet is formed in the tail of the soybean milk groove, and cooling efficiencies on the left and the right can be kept same; because the temperature of a soybean milk cooking groove is higher, the cooling efficiency of the cooling grooves is reduced along with the length, and multiple sets of cooling grooves can be formed; a water inlet and a water outlet are respectively formed in the edges of the soybean milk groove, and segmented cooling is adopted.

A transmission component of the upper parallel conveyor belt 5 comprises a first rotating shaft arranged at the front end, a middle rotating shaft arranged at the middle and a tail rotating shaft arranged at the tail. The entire conveyor belt is arranged right above the soybean milk groove 2 so as to receive heat energy generated by evaporation of water by the soybean milk groove, and the beancurd sheets are dried; the first rotating shaft is close to the upward-sloping conveyor belt, the tail rotating shaft is close to the beancurd sheet collecting drum, and the soybean milk groove is a rectangular flat container and is mounted in the water tank in a sealing inlaid manner; steam pipes are fully distributed in the inner cavity of the water tank, steam traps are mounted at the tail ends of the steam pipes, and the water tank is guaranteed not to be a pressure container in a heat exchange manner, so that production safety is guaranteed, and steam is not wasted. Water in the water tank is heated, and steam is changed into water after being cooled, then is drained through the steam traps and recovered to the boiler, so that recycling is realized, energy is saved, and the purposes of being environmentally-friendly and economic are achieved; the steam is exchanged in the pipeline, and a condition that the pressure container is formed in the water tank is avoided, so that the soybean milk groove is guaranteed to be level and free from deformation, and is safe.

The upward-sloping conveyor belt 4 and the parallel conveyor belt 5 both are connected with a driving motor arranged in the machine frame, the conveyor belts arranged in the machine both are provided with one driving motor, and a speed adjusting device, and a connecting part is driven by a stainless steel link in a connection manner, so that consistent pacing of the conveyor belts is guaranteed. Ten sets of stainless steel air blow pipes 7 with circular apertures are connected to the blower, and the stainless steel air blow pipes 7 are distributed above the soybean milk groove 2, and the circular apertures face downwards to blow wind directly to the soybean milk groove. The air blow pipes are arranged 10-50 cm above the soybean milk, so as to prevent too strong wind force of the air blow pipes from damaging the beancurd sheets which are just formed; the distance of every two air blow pipes is 20-150 cm, uniform blowing wind is kept, air blow apertures are formed in the air blow pipes, and the distance of every two air blow apertures is 5-20 cm. The water can be rapidly evaporated and diffused, so that the effect of rapidly forming the beancurd sheets is achieved, the production efficiency is improved, and the cost is reduced.

A soybean milk return aperture 9 or a soybean milk return groove is formed in the tail end of the soybean milk groove, so as to collect old soybean milk; the old soybean milk flows and returns to the head segment of the soybean milk groove, and is mixed with new soybean milk, so that consistent concentration in the soybean milk cooking groove can be kept.

Fences are arranged at the tail segment of the soybean milk groove, so as to prevent semi-solid beancurd sheets from blocking the soybean milk return aperture.

The soybean milk circulating pump can be used for adjusting the soybean milk returning speed, so as to indirectly adjust the concentration in the soybean milk groove.

The returned soybean milk operates, so that flow of the soybean milk in the soybean milk cooking groove can be facilitated, and the forming effect of the beancurd sheets is improved.

According to the automatic beancurd sheet making machine disclosed by the embodiment of the present invention, continuous sheet picking can be performed on beancurd sheets formed in the soybean milk groove, a condition that the machine needs to be stopped for sheet forming is avoided, and beancurd sheets can realize natural absorption of residual heat of the soybean milk groove on the conveyor belts like original manual work so as to realize drying by airing. The dried beancurd sheets are cut, and then packed, and automatic continuous operation is realized. The production efficiency is improved, the cost is reduced, consistent texture is guaranteed, and the defects of long-time training of skilled workers and human factors are overcome.

The disclosure abovementioned is only a preferable embodiment of the present invention, of course, the right scope of the present invention cannot be limited to the embodiment specifically disclosed, and therefore, equivalent changes made in accordance to the claims of the present invention still fall into the protection scope of the present invention.

The invention claimed is:

1. An automatic beancurd sheet making machine provided with cooling grooves, characterized by comprising a machine frame and a water tank arranged in the machine frame, wherein a soybean milk groove is formed in the upper part of the water tank in a sealing inlaid manner, and steam pipes are arranged in an inner cavity of the water tank; a soybean milk circulating pump is connected below one end of the soybean milk groove, and an upward-sloping conveyor belt is arranged above one end of the soybean milk groove; and one parallel conveyor belt is further arranged above the soybean milk groove, one end of the parallel conveyor belt is connected with the upward-sloping conveyor belt, the other end of the parallel conveyor belt is arranged in the machine frame and is connected with a beancurd sheet collecting drum arranged on one side of the machine frame, and at least one group of cooling grooves are respectively arranged in two sides of the soybean milk groove.

2. The automatic beancurd sheet making machine provided with cooling grooves of claim 1, characterized in that sections of the cooling grooves are one shape of a circle, square, or rectangle.

3. The automatic beancurd sheet making machine provided with cooling grooves of claim 1, characterized in that the cooling grooves are copper pipes.

4. The automatic beancurd sheet making machine provided with cooling grooves of claim 2, characterized in that the lower part of the water tank is further connected to a blower, a plurality of air blow pipes are connected to the blower, and air outlets of the air blow pipes are directed towards the soybean milk groove.

5. The automatic beancurd sheet making machine provided with cooling grooves of claim 1, characterized in that a transmission component of the upper parallel conveyor belt comprises a first rotating shaft arranged at the front end, a middle rotating shaft arranged at the middle, and a tail rotating shaft arranged at the tail, wherein the first rotating shaft is positioned close to the upward-sloping conveyor belt, and the tail rotating shaft is positioned close to the beancurd sheet collecting drum.

6. The automatic beancurd sheet making machine provided with cooling grooves of claim 1, characterized in that the soybean milk groove is a rectangular flat bottom container and is formed in the water tank in a sealing inlaid manner, steam pipes are fully distributed in the inner cavity of the water tank, and steam traps are mounted at the tail ends of the steam pipes.

7. The automatic beancurd sheet making machine provided with cooling grooves of claim 1, characterized in that the upward-sloping conveyor belt and the parallel conveyor belt both are connected with a driving motor arranged in the machine frame.

* * * * *